E. L. A. SAVY.
APPARATUS FOR MOLDING CHOCOLATE OR THE LIKE CONTAINING PRESERVED FRUITS, ALMONDS, &c.
APPLICATION FILED AUG. 19, 1911.
1,084,300.
Patented Jan. 13, 1914.
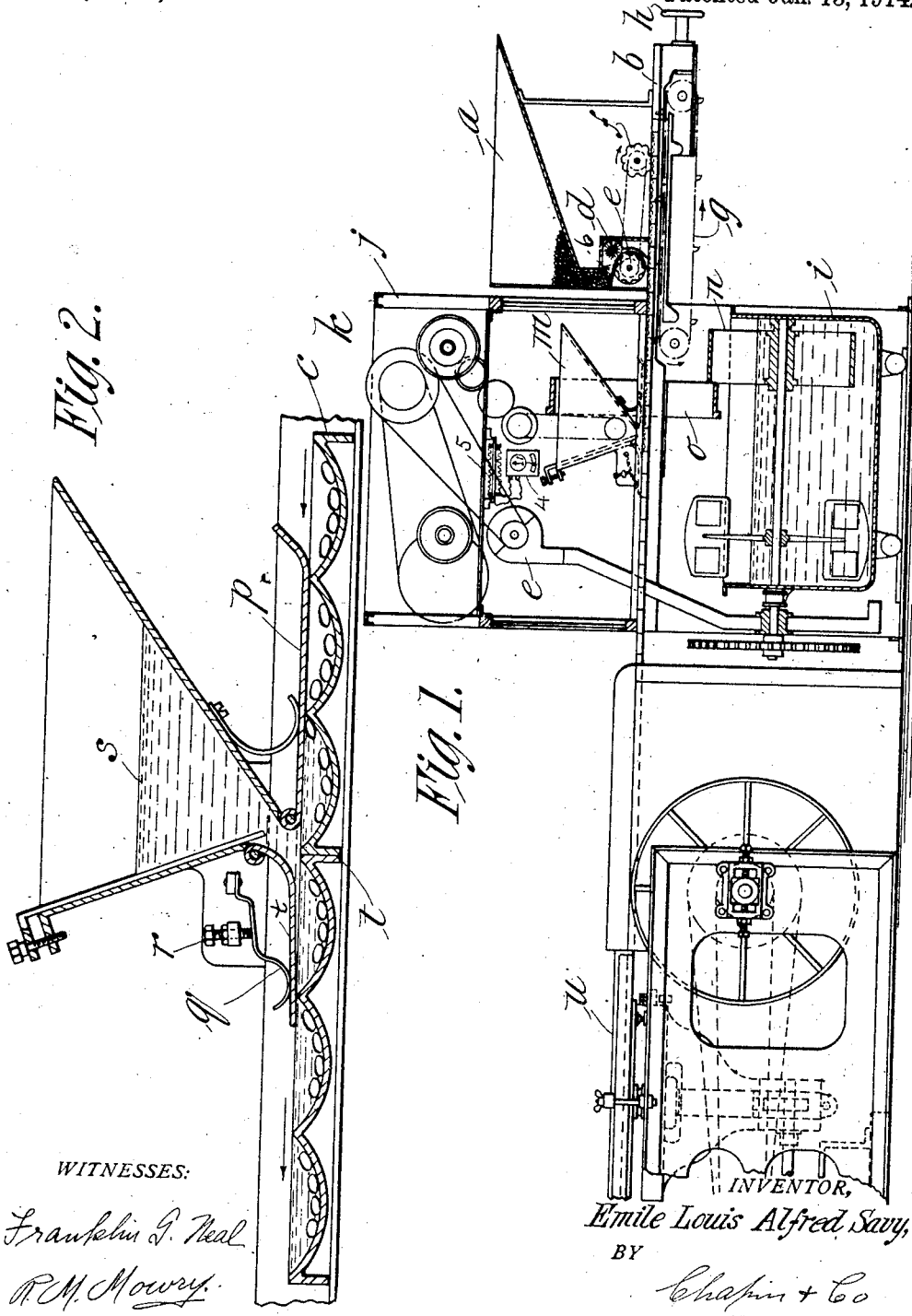
WITNESSES:
Franklin F. Neal
R. M. Mowry.
INVENTOR,
Emile Louis Alfred Savy,
BY
Chapin + Co
ATTORNEY.

UNITED STATES PATENT OFFICE.

EMILE LOUIS ALFRED SAVY, OF PARIS, FRANCE.

APPARATUS FOR MOLDING CHOCOLATE OR THE LIKE CONTAINING PRESERVED FRUITS, ALMONDS, &c.

1,084,300.　　　　　Specification of Letters Patent.　　Patented Jan. 13, 1914.

Application filed August 19, 1911. Serial No. 644,978.

*To all whom it may concern:*

Be it known that I, EMILE LOUIS ALFRED SAVY, a citizen of the Republic of France, residing at Paris, Department of the Seine, France, have invented new and useful Improvements in Apparatus for Molding Chocolate or the like Containing Preserved Fruits, Almonds, or other Hard Bodies, of which the following is a specification.

It has hitherto been necessary in molding chocolate and the like, which is to contain almonds, hazel nuts, walnuts, preserved fruit and material of a like nature, to do the work by hand.

This invention relates to an apparatus which is adapted to do this molding in an automatic manner and to turn the product out in an exact, uniform manner in regard to the material contained in each mold and the form of the molding.

The apparatus herein involved is specifically used where it is desired to mold chocolate almond bars, said bars being of a greater thickness than the thickness of the hard bodies to be molded with the chocolate.

It is not intended to limit the use of the apparatus to any particular or specific operation. All that is patentable in the disclosure, will be claimed in this or other applications.

The object of the invention is to provide an apparatus which will do the molding referred to above in an efficient and automatic manner.

Other objects of the invention will appear in the detailed description of the apparatus and of the claims annexed to said description.

Figure 1 is a side view of the complete apparatus assembled. Parts of it are shown in section to more clearly disclose the operation. Fig. 2 is a sectional view of the chocolate feeding mechanism arranged above the molds and showing spring-pressed scrapers to smooth off the chocolate in the molds after it has been fed thereto.

The apparatus disclosed herein is specifically adapted for forming the chocolate almond bar which is a well-known article of commerce. These bars are, in general, made up in two forms, first the bar is thin, so that the almonds or other nuts contained therein are not embedded completely in the chocolate, although slightly coated with the chocolate; they project out all over one side of the bar; second, the bar is thick and of ample dimensions for the almonds to be completely embedded therein. In the second case, when the bars are being molded, the tops of the molds can be smoothed off by scrapers, for the almonds can be contained wholly within the chocolate. The almonds are fed to the molds before the chocolate. The scrapers cannot be used in molding the bars in the first case, for they would tear away the almonds from the chocolate. In the first case the chocolate is fed to the molds before the almonds. An apparatus which will efficiently mold bars of the kind discussed in the first case, is disclosed in my co-pending application, Serial No. 644,977. The apparatus described in this application, as stated, is especially adapted for molding bars discussed in the second case above; but it is to be understood that the invention herein disclosed is not limited to the specific use but is capable of efficient operation, wherever scrapers can be used in molding chocolate or the like.

Referring to the drawings, the molds $c$ are fed upon the track $b$ at one end of the machine; the chain $g$ driven in any suitable manner, operates to drive the molds along the tracks up to the main driving wheel $f$ after they have been once fed thereto; the molds then pass one after the other, along the track, from one end of the machine to the other. The main feeder which controls the rate at which the molds pass along the tracks, is shown at $f$. This wheel $f$ is arranged to feed the molds at an even rate along the track. The molds are shown in Fig. 2 as having three hollows each in the direction of travel. There is a certain space between each hollow, and where the molds abut, one against the other, there is a double space. The wheel $f$ is arranged with sets of teeth, three teeth to a set, and between each set a blank space. This space is to accommodate the double space referred to where the molds abut one another.

Referring to Fig. 1, as the wheel $f$ rotates, the three teeth of a set corresponding to the three hollows of any mold, will operate with said hollows to drive the mold along the track and the three teeth of the following set will engage uniformly in the three hollows of the following mold, for the space between the sets of teeth accommodates the double space made by the abutting molds.

This is an important feature, as will later appear.

As the molds move along the track one after the other, they move under the almond-feeding device e and the almonds are fed to each mold in a quantity practically equal to the quantity fed to each of the other molds. This measured feeding of the almonds is accomplished as follows: The feed wheel e is connected by a chain to the wheel f, so that these two wheels operate together and in a definite speed relation. The peripheral hollows in the wheel e receive almonds from the hopper a, and a flap valve which is hinged loosely to the hopper a as shown, rests against the periphery of wheel e. As the wheel rotates, it acts on the flap valve to force the latter against the vertically adjustable brush 6. This action stirs the almonds in the hopper a, so that there will be an even and uniform feed therefrom. The brush d is mounted as shown, to coöperate with the wheel e in measuring the number of almonds fed to each mold. The teeth of the wheel e have a peculiar shape, that is, they are arranged in the nature of saw-teeth, only they rotate in the opposite direction to saw-teeth. The teeth being arranged this way, form hollows in the wheel e which have radial surfaces adjacent to the back of the teeth, and nearly tangential surfaces adjacent the front of the teeth. The almonds are fed into these hollows as shown, and as the wheel rotates, the brush d brushes the excess almonds in each hollow up the tangential surfaces into the following hollow. This operation has been found to be most efficient in measuring the almonds by the wheel 6, for it is found from experience that if the apparatus is made as described, the quantity of almonds fed to each hollow of the mold will be practically the same throughout a day's operation of the molding machine. The teeth of the wheel e are also arranged in a corresponding manner to the teeth of the feeding wheel f. There are three sets of teeth in the wheel e, and every third tooth is a wide one. This third tooth corresponds to the space between the sets of teeth in the wheel f, so that as the wheels f and e rotate together, the wheel f drives the molds under the wheel e, which wheel delivers measured quantities of almonds to each mold; and while the double space between two abutting molds is being fed by under the wheel e, no almonds will be fed, because the wide tooth will then be immediately over the double space. If the feed wheel e is divided by walls at right angles to its axis the wheel will then be divided into parallel series of compartments. The almonds would then be distributed in a uniform and positive manner and could not crowd up into one end of the mold.

The molds might be sub-divided into as many compartments as desired as by cross-walls and the feed wheels e similarly divided so that the feed of the almonds to each compartment would be the same.

The specific form of the feed wheel and molds can have many variations without departing from the generic principle of the devices herein shown. An apron is indicated, to prevent the almonds which are fed by the wheel e, from leaving the hollows thereof until the feeding position is reached. The means herein disclosed for feeding the molds along the track and the almonds to the molds is identical with that disclosed in my co-pending application referred to before and it is clearly described therein.

When the molds have been fed with almonds, they are fed into the casing as shown in Fig. 1. This casing is kept at a constant temperature by means of the electric heating device 5, and the hand thermostatic regulating device 4. A fan e within the casing, takes the heated air from the heating device 5 and forces it to the lower part of the casing, and thus maintains a constant circulation. If the temperature falls below or rises above the point at which the thermostat is set, the circuit through 5 will be closed or opened.

Within the casing is located the chocolate feeding device m and under the trackway which extends to the casing, as shown, is a large tank i. This tank is mounted on a track and can be conveniently removed from the casing, when desired. The chocolate can be supplied to the tank i before it is put into the casing. The temperature within the casing will melt the chocolate, and the tank is also provided with a stirring device mounted on a horizontal shaft, as shown. This shaft is operated from any driving means, as indicated. It also has mounted thereon an elevating device n. This device lifts the melted chocolate to the rotating wheel o and from this wheel it drops into the chocolate-feeder m. The particular way in which the chocolate is fed into the feeder m does not specifically form any part of this invention; therefore it is only diagrammatically indicated on the drawings.

The chocolate feeder m is best shown in Fig. 2. It is located just above the track, with space enough between it and the track to pass the molds therebetween. As the molds pass under the chocolate feeder, there are two spring-pressed scrapers t and p, which bear downwardly on the molds in the manner disclosed in Fig. 2. It can be seen clearly from the drawings that, as the molds pass by the chocolate-feeder, and the chocolate is fed to each mold, the spring-pressed scraper on the right of Fig. 2 prevents any of the almonds from one mold being pushed over into the following mold. The spring-pressed scraper t pivoted at a convenient point is adapted to have its pressure regulated by means of the screw $r$ suitably mounted, as shown. Now as the chocolate which has covered the almonds leaves the chocolate-feeder, the spring-pressed scraper with just the right amount of pressure, will smooth off the material in each mold. The action of these spring pressed plates is one of the most important features of applicant's apparatus as will be seen from the following considerations. As the molds advance to the chocolate feeder they already contain the almonds as shown. The plate $p$ completely covers the top of each compartment just before the chocolate is fed thereto. Now as the chocolate enters when the mold advances (see Fig. 2) it does so with a certain force and if it were not for the plate $p$ the chocolate would rush into one mold and over into the next and very likely carry some of the almonds from one mold to the one following and thus destroy the uniformity of the product. The plate $p$ absolutely prevents this undesirable action. This is clearly shown in Fig. 2. This structure overcomes one of the difficulties hitherto found in feeding chocolate to the molds at a sufficient speed. The plate $t$ as shown is inclined slightly to the horizontal. It wipes the top of each mold as it leaves the chocolate feeder and evens off the material to a horizontal plane as shown. The inclination of this plate is just enough as shown to allow the chocolate free passage from the mold leaving the feed opening to the mold just coming up to the feed but the opening between the plate $t$ and the mold leaving is not sufficient to allow any almonds to pass from one compartment to another. This plate $t$ arranged as described overcomes a serious objection present in scrapers formerly used because the almonds or other hard bodies would be pushed from one mold or compartment of a mold to another. This undesirable action is positively prevented by the structure herein described. The molds then pass along the track out of the casing, through a small opening, as indicated, and on to a shaking table $u$. The specific form of this table forms no part of the invention and one suitable form is shown clearly in the drawings. It is not thought necessary to describe the operation of this table, as it is very well known in the art. After the molds have been on the table $u$ a certain length of time, the violent shaking which the material in the molds receives through the table will force the almonds from the position indicated in Fig. 2, to mount up near the surface of the chocolate and cause the surface to bulge outwardly around each nut to just the right amount, in order that a rich and nutty appearance of the bar will result. The driving mechanism shown above the casing, as indicated, is adapted to drive the fan $e$ and a chocolate stirrer located as indicated in the feeder $m$.

From the structure described, it will be seen that the molds pass from one end of the machine to the other, first having almonds fed thereto by the wheel $e$, then having chocolate fed thereto by the feeder $m$, then scraped by the spring-pressed scraper $t$ and then passed upon a shaking table to force the almonds to the flat surface of the chocolate bar. The apparatus thus serves to mold the chocolate automatically and turn out a product not only equal to but better than can be turned out by hand for it is of more uniform grade and appearance.

It is to be understood that although applicant specifically discloses a means for molding chocolate bars, any form of chocolate-almond, could be molded within the limits of the apparatus. For instance, instead of having long bars of chocolates, squares could be formed by properly dividing the molds by transverse walls, and by correspondingly dividing the almond feeding wheel $e$ by transverse walls. Many other shapes besides squares could be correspondingly formed with this apparatus.

Claims.

1. In a chocolate molding machine the combination with a set of molds of a casing adapted to keep the molds and the chocolate at a constant temperature; a track-way; means to feed the molds along said trackway, said track-way extending from one end of the apparatus to the other; mechanism to feed hard bodies to the molds, a chocolate-feeding device to feed chocolate to the molds after the hard bodies have been fed having thereon spring-pressed plates adapted to act as scrapers for the material fed into the molds.

2. The combination of a track-way; a mold adapted to be guided by said track-way; means to feed hard bodies to said mold; means to feed chocolate to said mold after the hard bodies have been fed thereto; means to scrape the exposed surface of the mold after the chocolate has been fed thereto comprising a spring-pressed plate hinged to said chocolate feeding means pressing the molds and inclined enough to the molds to allow chocolate to enter but to prevent almonds from leaving the molds; and means to force the hard bodies to the scraped surface of the material in the molds.

3. The combination of a series of molds; a chocolate-molding apparatus, comprising a track-way arranged to guide said molds from one end of the apparatus to the other; means adjacent to said track-way to feed almonds to said mold; means also adjacent to said track-way to feed chocolate to said molds as they are guided along the track-way; mechanism to scrape the exposed surfaces of the material in said molds comprising two spring-pressed plates to bear on the tops of the molds, one pressing the molds in the rear of the chocolate feeder to prevent almonds from passing from one hollow to another, and the other pressing the tops of the molds to scrape the chocolate and inclined enough to the molds to allow chocolate to enter but prevent almonds from leaving the molds.

4. In a chocolate-molding apparatus the combination of a set of molds; means to guide said molds from one end of the apparatus to the other; mechanism arranged adjacent said guiding-means to drive said molds along said driving means at a uniform rate of speed; means arranged to feed almonds to said molds, said means being connected to said driving wheel, to give the feeding means and said wheel a definite speed relation; means arranged adjacent to said guiding means to feed chocolate to said molds and mechanism arranged to scrape the exposed surfaces of the molds, and smooth the material in the molds after it has been fed thereto, comprising a plate hinged to the outlet of the chocolate feeding means and arranged at an inclination to the molds sufficient to allow chocolate to enter and prevent the almonds from leaving the molds, said mechanism being adjustable to give any desired degree of pressure.

5. The chocolate molding apparatus comprising a set of molds; a guiding means arranged to guide said molds through said apparatus; driving means to drive said molds through said apparatus in a uniform manner; mechanism to feed almonds to the molds in measured quantities; mechanism for feeding chocolate in a liquid state to the molds after the almonds have been fed thereto, and mechanism to scrape the chocolate so fed in the molds and leave the molds filled with material in a uniform manner,—and means to receive the molds filled with material and shake them until the almonds mount to the scraped surfaces of the chocolate.

6. The combination in a chocolate-molding machine, a set of molds; a trackway in said machine to guide said molds from one end of the machine to the other; mechanism arranged adjacent to said track-way, to feed almonds to the molds as they pass along the track-way, and comprising means for driving the molds at a definite speed relation to the speed of the almond-feeding mechanism, and means to feed chocolate to said molds, after the almonds have been fed thereto.

7. A chocolate-molding apparatus comprising a set of molds, guiding devices for said molds, means to feed hard bodies to said molds mounted adjacent said guiding devices, a chocolate-feeding device arranged adjacent said guiding devices to feed chocolate to said molds after the hard bodies have been fed thereto, mechanism to bear on said molds and prevent the hard bodies in one compartment from passing to another compartment.

8. The combination of a chocolate-feeding device, a set of molds, means to guide said molds by the outlet of said feeding device, a nut-feeding device arranged to feed nuts to the molds before the molds reach said outlet, a spring-pressed plate arranged to cover each compartment of the molds before it reaches the outlet and prevent the chocolate entering the compartment at the outlet from passing to the covered compartment and carrying nuts from one compartment to another (all for the purpose described).

9. The combination of a chocolate-feeding device, a set of molds, means to guide said molds by the outlet of said feeding device, a nut-feeding device arranged to feed nuts to the molds before the molds reach said outlet, a spring-pressed plate arranged to cover each compartment of the molds before it reaches the outlet and prevent the chocolate entering the compartment at the outlet from passing to the covered compartment and carrying nuts from one compartment to another (all for the purpose described), and a spring-pressed plate arranged to scrape the chocolate in the molds as the latter leave the outlet; said plate being inclined enough to allow the excess chocolate from the mold leaving the outlet to pass to the following mold, but not being inclined enough to allow nuts to pass from one mold to the other.

10. A chocolate molding machine comprising a set of molds, means for feeding nuts to the molds, chocolate-feeding means, guiding devices to first guide the molds past the nut-feeding means, and then to guide the molds by the chocolate-feeding means, and means mounted adjacent to the chocolate-feeding means to scrape the excess chocolate from one compartment of a mold to another compartment, the space between said scraping means and the molds being sufficient to allow chocolate to flow but not sufficient for nuts to pass therebetween all for the purpose described.

11. A chocolate-molding apparatus comprising a set of molds, a track-way to guide said molds from one end of the apparatus to the other, a nut-feeding device and a chocolate-feeding device arranged adjacent to the track-way to feed first nuts and then chocolate to the molds and means adjacent the outlet opening of the chocolate-feeder to prevent the chocolate fed to the molds from forcing the nuts from one compartment of a mold to another, said means comprising a device to smooth off the material in the molds as they leave the chocolate feeder.

12. In combination, molds, guiding means therefor, a feeding device to feed articles thereto, means for feeding chocolate to the molds after the articles have been fed thereto, and a driving device to move the molds along the guiding means.

13. In combination, molds, a guideway therefor, a hopper arranged above the guideway to fill said molds as they pass along the guideway, a yieldingly mounted plate adjacent to the hopper and arranged to cover the tops of the molds prior to their passing under the outlet of the hopper, and a second yieldingly mounted plate arranged adjacent the outlet of the hopper and arranged to scrape the excess material fed to each mold as the mold passes beyond the hopper, all for the purpose described.

14. In combination, molds, guiding means therefor, a feeding device to feed articles thereto, means for feeding chocolate to the molds after the articles have been fed thereto, a driving device to move the molds along the guiding means, and a shaking table onto which the molds pass whereby the articles are caused to work to the surface of the chocolate.

15. In combination, molds, a guideway therefor, a hopper mounted above the guideway to feed almonds to the molds, a feed-wheel mounted at the outlet of the hopper to control the flow of almonds having a series of pockets into which the almonds flow, said pockets having one side substantially radial and the other side substantially tangential with respect to the wheel, and a brush operating against the tangential side to expel the excess almonds in one pocket into the next succeeding pocket.

16. In combination, molds, a guideway therefor, a hopper to feed articles thereto mounted above the guideway, a loosely mounted valve at the outlet of said hopper, a feed-wheel mounted below the hopper containing projections on the periphery to agitate said valve, and driving means for moving the molds along the guide-way, and means to drive the feed-wheel from said driving means.

17. The combination of a series of molds, a chocolate-molding apparatus comprising means to guide said molds from one end of the apparatus to the other, means adjacent to said first mentioned means to feed a plurality of filling articles to said mold, means also adjacent to said first-mentioned means to feed chocolate to said molds as they pass through the apparatus, mechanism to scrape the exposed surfaces of the material in the molds comprising two spring-pressed plates, to bear on the top of the molds, one pressing the molds in the rear of the chocolate feeding means to prevent said articles from passing from one hollow to another and the other pressing the tops of the molds to scrape the chocolate and inclined enough to the molds to allow chocolate to enter but prevent said articles from leaving the molds.

EMILE LOUIS ALFRED SAVY.

Witnesses:
S. B. De Golyer,
Franklin G. Neal.